United States Patent [19]

Stoeppelmann

[11] Patent Number: 5,869,157

[45] Date of Patent: Feb. 9, 1999

[54] ADHESION PROMOTER COMPOSTION ON THE BASIS OF POLYAMIDE

[75] Inventor: Georg Stoeppelmann, Bonaduz, Switzerland

[73] Assignee: EMS-Inventa AG, Zurich, Switzerland

[21] Appl. No.: 905,919

[22] Filed: Aug. 5, 1997

Related U.S. Application Data

[62] Division of Ser. No. 720,666, Oct. 2, 1996, Pat. No. 5,804,670.

[30] Foreign Application Priority Data

Oct. 4, 1995 [DE] Germany ................. 195-37-003-1

[51] Int. Cl.$^6$ ........................................... B29D 22/00
[52] U.S. Cl. .................. 428/36.91; 428/421; 428/474.4; 428/476.3; 525/420
[58] Field of Search ................. 428/36.91, 421, 428/474.4, 476.3

[56] References Cited

U.S. PATENT DOCUMENTS

| | | |
|---|---|---|
| 4,319,019 | 3/1982 | Lehmann et al. . |
| 4,543,378 | 9/1985 | Suhara et al. ............ 524/100 |
| 5,140,098 | 8/1992 | Pipper et al. . |
| 5,170,011 | 12/1992 | Martucci ................... 174/47 |
| 5,383,087 | 1/1995 | Noone et al. . |
| 5,510,160 | 4/1996 | Jadamus et al. ............ 428/36.91 |
| 5,656,121 | 8/1997 | Fukushi ................... 156/326 |

FOREIGN PATENT DOCUMENTS

| | | |
|---|---|---|
| 0 101 207 | 2/1984 | European Pat. Off. . |
| 637 509 A1 | 2/1995 | European Pat. Off. . |
| 4326 130 A1 | 2/1995 | Germany . |
| 4-8729 | 1/1992 | Japan . |

*Primary Examiner*—Helen L. Pezzuto
*Attorney, Agent, or Firm*—Hill & Simpson

[57] ABSTRACT

The invention is directed to a new adhesion promoter composition based on polyamide having an excess of amino end groups and at least one diamine added to the polymerized polyamide, said diamine being selected from substituted or unsubstituted, aliphatic $C_4$–$C_{20}$ diamines or mixtures thereof. The adhesion promoter tightly connects thermoplastically workable fluoropolymers based on VDF, TFE and HFP with polyamides. The invention is also directed to thermoplastic multi-layer composites having at least one inside layer of thermoplastically workable fluoropolymers, at least one adhesion promoter layer composed of the aforementioned adhesion promoter molding compound, and having at least one polyamide outside layer, wherein these layers are tightly connected to one another. Finally, the invention is directed to multi-layer polymer tubes.

6 Claims, No Drawings

ADHESION PROMOTER COMPOSTION ON THE BASIS OF POLYAMIDE

This is a division of application Ser. No. 08/720,666, filed Oct. 2, 1996, now U.S. Pat. No. 5,804,670.

FIELD OF THE INVENTION

The invention is directed to the subject matter recited in the patent claims.

The invention is particularly directed to a new polyamide-based adhesion promoter that joins thermoplastically workable fluoropolymers based on vinylidene fluoride (VDF), particularly based on a mixture of tetrafluoroethylene (TFE), hexafluoropropylene (HFP) and vinylidene fluoride (VDF), with polyamides through a tight connection. Layers composed of the adhesion promoter polyamide composition of the present invention can be utilized as intermediate layers in multi-layer composites in order to achieve a tight connection between the individual layers. The multi-layer composites of the present invention are employed in structural parts in the fields of electrical engineering, mechanical engineering and the automotive industry wherever the disadvantageous properties of the polyamide are to be compensated by a combination with fluoropolymers. In particular, it is employed as sheets or as multi-layer tubes, for example in the field of the automotive industry. The invention is therefore also directed to a polyamide-based adhesion promoter that, in particular, is to be utilized in a co-extrusion process in order to tightly connect tubes of polyamide, particularly polyamide 12, and fluoropolymers, eg. a terpolymer of VDF, TFE and HFP to one another. This connection between the individual tube layers takes effect after the tube extrusion and is also maintained after the immersion of the multi-layer tubes of the present invention in fuel.

DESCRIPTION OF THE PRIOR ART

Polyamides or, respectively, fluoropolymers are unsuitable for a number of applications. Even though polyamides exhibit extremely good mechanical properties such as good impact strength, etc., they have a poor barrier effect to polar substances that can easily migrate through polyamides. In view of the tendency towards stricter environmental protection and safety regulations, for example, this makes it undesirable as a material for fuel lines.

A further disadvantage of, in particular, singlelayer fuel lines made of polyamide, specifically of polyamide 11 or 12, lies in the considerable absorbency of the polymers for specific constituents of the fuels, which leads to swelling and, thus, to changes in length of the pipelines.

Developments are known from the U.S.A. wherein fluoropolymers are utilized as barrier layers. These polymers are not only extremely expensive but are also difficult to work, difficult to dispose of and exhibit only slight composite adhesion in co-extrusion processing. Furthermore they are incompatible with polyamides, which results in inadequate adhesion between the laminate layers in the manufacture of multi-layer composites. A tight, thermoplastic multi-layer composite, however, is absolutely necessary in technical applications.

Developments have therefore been implemented in order to improve the aforementioned systems.

U.S. Pat. No. 5,383,087 discloses multi-layer tubes with a fluoropolymer inside layer and an outside layer of polyamide 6, polyamide 12 or polypropylene. Fluoropolymer-polyamide blends are utilized as an adhesion promoter between these two layers. These adhesion promoters, however, only exploit physical interactions and therefore have relatively low coefficients of adhesion. Furthermore, the employment of a fluoropolymer-polyamide blend is problematical since a dehydrofluoridation of the fluoropolymers occurs over the long term and a degradation of the fluoropolymers occurs. The hydrogen fluoride that thereby arises is a highly corrosive gas that irritates the respiratory organs, which is undesirable in consideration of environmental protection and safety.

EP 637 509 A1 discloses five-layer tubes of fluoropolymers, polyesters and polyamides. The two adhesion promoting layers are made of thermoplastic polyurethane, polyether block amides, polyester block amides, polyolefins, polyester copolymers.

EP 0 101 207 discloses a polyamide composition having an enhanced adhesion to coatings formed from various paints. This composition comprises a polyamide whose ratio of the terminal amino group concentration to the carboxylic acid group concentration is at least 1.5, an inorganic filler and a triazine.

DE 43 26 130 A1 discloses multi-layer composites of polyamide and polyvinylidene fluoride (PVDF). A tight connection is achieved by adding polymethacrylamide to PVDF. The disadvantage of pipes wherein PVDF is employed as barrier layer, however, is the low flexibility thereof, which can lead to a buckling of the pipe having tight bending radii.

OBJECTIVE OF THE PRESENT INVENTION

It is therefore an object of the invention to provide polyamide-based adhesion promoters that tightly connect thermoplastically workable fluoropolymers, particularly fluoropolymers based on TFE, HFP and VDF to polyamides. Furthermore, the provision of thermoplastic multi-layer composites, in particular multilayer tubes, of these materials is another objective. The compositions and the thermoplastic multi-layer composites manufactured therefrom should meet the following demands:

The materials composed of the fluoropolymers and polyamide should tightly adhere to one another in the thermoplastic multi-layer composites.

The thermoplastic multi-layer composite of fluoropolymer and polyamide compositions should be resistant to fuels and should exhibit adequately low permeation.

Current environmental protection and safety regulations for fuel lines should be met.

SUMMARY OF THE INVENTION

The objective of the present invention is achieved by an adhesion promoter composition based on a polyamide having an excess of amino end groups i.e. whose ratio of amino-end groups to carboxyl end groups lies in the range of 1.5:1 to 3:1, and wherein at least one diamine is added to the polymerized polyamide in an amount of 0.25 to 2 weight percent, said diamine being selected from the group consisting of substituted or non-substituted aliphatic C4 to C20 diamines, and mixtures thereof. This adhesion promoter composition tightly joins thermoplastically workable fluoropolymers, particularly those based on TFE, VDF and HFP, with polyamides. It is preferred that the diamine be a α, ω—diamine.

It has been surprisingly found that only the combination of a diamine (dodecyl diamine or decyl diamine) and a polyamide, for example polyamide 12, having an excess of $NH_2$ end groups yields optimum adhesion values since a direct chemical reaction between the adhesion promoter and the fluoropolymer apparently occurs in the boundary layer. In other words, when a polyamide, e.g. polyamide 12, with an excess of amino end groups is used without a diamine or when a polyamide, for example polyamide 12, balanced in the amino end groups, is utilized together with diamine as the adhesion promoter, for example, adequate adhesion cannot be achieved after the coextrusion process.

Further, the present invention also provides a thermoplastic multi-layer composite having at least one fluoropolymer inside layer, at least one intermediate layer comprised from the above-described adhesion promoter composition, and at least one outside layer. It also provides a multi-layer tube comprising at least one inside layer of a fluoropolymer, an intermediate layer of the adhesion promoting composition, and at least one polyamide-based outside layer.

Advantageous embodiments of the invention are defined in the subclaims.

Polycondensates of aliphatic lactams or ω-aminocarboxylic acids with 4–44 carbon atoms, preferably 4–18 carbon atoms, or those of aromatic ω-aminocarboxylic acids with 6–20 carbon atoms are preferably utilized as the polyamides in the present invention.

Polycondensates of at least one diamine and at least one dicarboxylic acid with respectively 2–44 carbon atoms are also suitable. Examples of such diamines are ethylenediamine, 1, 4-diaminobutane, 1, 6-diaminohexane, 1, 10-diaminodecane, 1, 12-diaminododecane, m- and p-xylylenediamine, di(aminomethyl)cyclohexane, bis-(p-aminocyclohexyl) methane and its alkyl derivatives.

Examples of dicarboxylic acids are succinic, glutaric, adipic, pimelic, subenc, azelaic and sebacic acid, dodecanedioic acid, 1, 6-cyclohexanedioic acid, terephthalic acid, isophthalic acid and naphthalenedioic acid.

Especially suitable polyamides for the adhesion promoter composition, multi-layer composite or multi-layer tube of the present invention are homo and copolyamides such as PA6, PA11, PA12, PA46, PA1212, PA1012, PA610, PA612, PA69, PA6T (wherein T stands for a terephthalic acid compound), PA6I (wherein I stands for a isophthalic acid compound), PA10T, PA12T, PA12I or mixtures thereof. Also, copolymeric polyamides such as nylon 6/66, nylon 6/612, nylon 6/610, nylon 6/66/610, nylon 6/66/12, nylon 6/6T and nylon 6/6I may be used in the present invention. However, nylon 11, nylon 1212, nylon 10T and nylon 12T are preferred as polyamides in the present invention. For specific purposes, however, other standard polymers can also be added to these polyamides. The polyamides used in the present invention may contain standard additives such as ultraviolet and heat stabilizers, crystallization accelerators, softeners, flame-retardants, lubricants, inorganic fillers and additives that increase the electrical conductivity.

Further, reinforcing material or fillers such as glass fibers or balls, or carbon or mineral fibers can be added to the polyamides. In a preferred embodiment of the present invention, polyamide 12 is used. The polyamide material for the adhesion promoter is particularly distinguished by an excess of amino end groups, i.e. the end group ratio of —NH2—: —COOH groups lies in the range of 1.5:1 to 3:1, whereby 2.5:1 is especially preferred. In a preferred embodiment of the present invention, the base polyamide has a relative viscosity of 1.7–2.5, particularly 2.1 (measured in a 0.5% m-cresol solution at 25° C. according to DIN53727/ISO 307).

The problem of adhesion between the two said polymers, i.e. between the polyamide outside layer and the fluoropolymer inside layer, is solved in a specific embodiment of the invention in that a polyamide 12 having a relative viscosity of 2.10 and a carboxyl end group number (end group concentration) of approximately 20 $\mu$Eg/g and a $NH_2$ end group number (end group concentration) of 50 $\mu$Eq/g and a diamine such as decyldiamine or dodecyldiamine are extruded together. In particular, this is carried out in such a way that the polyamide is allowed to polymerize first and that the desired quantity of diamine is then added thereto, or is mixed in a separate extrusion step. The diamine can be added in quantities of 0.25–2 weight percent, preferably in quantities of one weight percent.

The diamine is preferably selected from the group consisting of hexyldiamine, long-chain $C_{10}$–$C_{14}$ diamines and mixtures thereof. Decyldiamine and dodecyldiamine are especially preferred.

When the PA12 having an excess of amino end groups is employed without any diamine or when a PA12 balanced in the amino end groups is utilized together with diamine as an adhesion promoter, then adequate adhesion cannot be achieved directly after the coextrusion process of the respective polymer compounds. In this case, the adhesion is only achieved following annealing at 100°–130° C. or after being stored for several days at room temperature.

Terpolymers based on TFE, HFP and VDF, and also ones based on TFE, PMVE and VDF are particularly suitable as the fluoropolymer. Furthermore, VDF copolymers can also be used in the present invention.

The manufacture of the adhesion promoter composition is preferably carried out by one extrusion pass of the individual constituents. A powder mixture of the individual constituents, i.e. of the polyamide granulate and of the diamine powder, is therefore also utilized in a specific applied form of the invention.

The manufacture of the multi-layer composites of the present invention can be carried out in one or in several steps. In a single-step extrusion process, the various melts are co-extruded in a standard way. In the multi-step method, a part is first produced from one constituent and is then joined to the other constituents by pressing, injection molding or extrusion.

The multi-layer composites of the present invention exhibit to an excellent extent, good chemical resistance as well as a good barrier effect to chemical reagents, solvents and fuels. Further, the layers are tightly connected to one another.

This tight connection takes effect directly after the extrusion and is also preserved after immersion of the composites into fuel.

The multi-layer composites of the present invention are employed for structural parts, such as molded parts, hollow profiles etc., particularly in the automotive industry, electrical engineering and mechanical engineering. They are especially employed as multi-layer sheets or tubes in the automotive field.

The multi-layer tubes of the present invention, which may, as an option, be partly or completed corrugated, are composed of an inside layer of fluoropolymer based on VDF, TFE and HFP, an outside polyamide layer and an intermediate polyamide adhesion promoter layer. They may also comprise additional outer layers as necessary. The basic material of the adhesion promoter, as set forth above, is characterized by an excess of amino end groups. It also contains an added diamine. The inside layer of the inventive polymer tube is inert with respect to the medium to be conveyed; the outside layer is resistant to pressure and mechanical influences.

The layer thickness of the tube of the present invention is not critical. The following are preferred:

Outside layer thicknesses in the range from 0.2–0.8 mm;
Adhesion layer thicknesses in the range from 0.05–0.3 mm; and
Inside layer thicknesses in the range from 0.01–0.7 mm.

As stated above, the wall of the tube may be provided with an annular or helical corrugation. The protective layers may be rendered antistatic and/or resistant to impact. Plasticizers or other conventional additives may be added. Furthermore, glass fibers may be added to make the tube dimensionally stable in the longitudinal direction.

The invention, however, is also directed to multi-layer polymer tubes, wherein the tube is corrugated in at least one sub-section thereof, and the rings formed by the corrugations proceed around the axis of the pipeline, whereby the corrugations are fashioned at least partially in oval form or in the form of an ellipse or, as the case may be, in the form of a circle flattened at one side. Such new geometries, i.e. shapings of the corrugations of pipelines, are disclosed in DE 44 32 584.3 (EMS-Inventa), which has not yet been laid open and whose full content is referenced here.

The polymer tube of the present invention may be produced by coextrusion. As required corrugations and flat sections may be subsequently formed by a continuous method such as blow forming or suction forming. Alternatively, these corrugations and/or flat sections may be formed by a discontinuous method such as blow molding, coextrusion blow molding and sequential blow molding, with or without tube manipulations.

The invention shall now be. set forth in greater detail with reference to the following examples:

DETAILED DESCRIPTION OF THE INVENTION

EXAMPLES

The following polymers are utilized for the manufacture of three-layer tubes using commercially standard co-extrusion systems:

Inside layer: Terpolymer of tetrafluoroethylene, hexafluoropropylene, vinylidene fluoride (tradename THV 500G, 3M).

Middle layer: PA1: Polyamide 12 with a relative viscosity of 2.1 (measured in 0.5% m-Cresol), COOH end group number of 20 $\mu$Eq/g and a $NH_2$ end group number of 50 $\mu$Eq/g.

PA2: Polyamide 12 with a relative viscosity of 2.25 (measured in 0.5% m-Cresol), COOH end group number of 40 $\mu$Eq/g and a $NH_2$ end group number 30 $\mu$Eq/g.

PA3: 99 weight % polyamide PA1, 1 weight % decyldiamine

PA4: 99 weight % polyamide PA1, 1 weight % dodecyldiamine.

The middle layer materials PA3 and PA4 were manufactured using standard double screw extruders.

Outside layer: Plasticized PA12 (Grilamid L25W40X), black, of EMS-Chemie, Switzerland).

Smooth three-layer tubes (8×1 mm) were manufactured from the above materials and were tested. For testing the adhesion, the tubes were helically cut. A subsequent attempt was made to mechanically separate the layers and to separate them by storing them in fuel FAM B (DIN51604A).

The permeation measurements were carried out in a dynamic measuring installation (EMS TESTER made by EMS-CHEMIE AG, Switzerland) at 60° C. and 4 bar.

The results obtained are shown in the following table. As inventive examples 3 and 4 prove, a tight connection of the individual layers is present directly after the tube extrusion and is also preserved after the immersion of the tubes in fuel.

TABLE

| Examples | 1 | 2 | 3 (inventive) | 4 (inventive) |
|---|---|---|---|---|
| Tube structure from inside to outside: | | | | |
| THV 500G | 0.2* | 0.2 | 0.2 | 0.2 |
| PA1 | 0.1 | | | |
| PA2 | | 0.1 | | |
| PA3 | | | 0.1 | |
| PA4 | | | | 0.1 |
| L25W40X black | 0.7 | 0.7 | 0.7 | 0.7 |
| Mechanical separation directly after extrusion | yes | yes | no | no |
| Separation after storing in FAM B** at 60° C. | yes | yes | no | no |
| Mechanical properties: | | | | |
| Cold impact strength - 40° C., DIN 733 78 | — | — | Without fracture | — |
| Cold impact 40° C., SAE J844d | | | Without fracture | |
| Burst pressure 23° C. Flexibility SAE J844d | | | 65 bar | |
| Permeation FAM B, 60° C., 4 bar | | | 13N 0.7 g/m/daily | |

— = not measured
* = layer thickness (mm)
** = FAM B = fuel FAM B according to DIN 51604A

I claim:

1. A multilayer tube comprising:
   at least one fluoropolymer inside layer;
   at least one intermediate layer comprising an adhesion promoter composition comprising: a polyamide having a ratio of amino end groups to carboxyl end groups of from about 2.5:1 to about 3:1, and from about 0.25 to about 2 weight percent, based on the weight of the adhesion promoter composition, of at least one added diamine selected from the group consisting of aliphatic $C_1$ to $C_{20}$ diamines; and
   at least one polyamide outside layer.

2. The multilayer tube according to claim 1 wherein the fluoropolymer comprises units selected from the group consisting of tetrafluoroethylene (TFE), hexafluoropropylene (HFP), vinylidene fluoride (VDF) and perfluoromethylvinylether (PMVE).

3. The multilayer tube according to claim 1 wherein the outside layer has a thickness in the range of 0.2 to 0.8 mm, the intermediate layer has a thickness in the range of 0.05 to 0.3 mm and the inside layer has a thickness in the range of 0.01 to 0.7 mm.

4. The multilayer tube according to any one of claims 1 to 3 wherein the inner layer has a surface resistance of less than $10^9 \Omega$ and at least one of the layers is electrically conductive.

5. A multilayer tube as defined in claim 1, wherein said fluoropolymer comprises a polymer comprising units of tetrafluoroethylene (TFE), hexafluoropropylene (HFP), and vinylidene fluoride (VDF).

6. A multilayer tube as defined in claim 1, wherein said fluoropolymer comprises a polymer comprising units of tetrafluoroethylene (TFE), perfluoromethylvinylether (PMVE), and vinylidene fluoride (VDF).

* * * * *